Patented June 27, 1933

1,915,308

UNITED STATES PATENT OFFICE

GEORGE DE WITT GRAVES, OF WILMINGTON, DELAWARE, ASSIGNOR TO E. I. DU PONT DE NEMOURS & COMPANY, OF WILMINGTON, DELAWARE, A CORPORATION OF DELAWARE

PROCESS OF ESTERIFICATION

No Drawing. Application filed June 26, 1931. Serial No. 547,181.

This invention relates to the preparation of organic acid esters and more particularly it relates to a continuous method for the preparation of esters from olefines and carboxylic acid.

Prior art

The production of esters from olefines and organic acids is not broadly new. German Patent 372,717 claims a method for the production of ethyl acetate in which sulfuric acid is first saturated with ethylene at 140° C. and is then heated with acetic acid. After heating for some time the ethyl acetate is separated from the resulting mixture by distillation in the presence of water. A series of U. S. patents assigned to Seth B. Hunt (U. S. 1,365,049, 1,365,050, and 1,365,051), deals with the preparation of esters by treating sulfuric acid with ethylene or other olefines, including unsatuated petroleum products such as those obtained by cracking, and then treating the resulting "acid liquor" with acetic acid or with a salt of acetic acid. According to U. S. 1,365,052 also assigned to Seth B. Hunt, the olefine is heated with a fatty acid, preferably in excess of the amount required to esterify the olefine, in the presence of an acid catalyst. U. S. 1,790,521 covers the esterification of secondary olefines (those yielding secondary alcohols) from cracked petroleum by treatment of the olefines with organic acids in the presence of a catalyst, such as sulfuric acid.

The methods for the preparation of esters just cited are all discontinuous processes. The olefine is either absorbed in sulfuric acid and the resulting mixture treated with a substantially equivalent amount of organic acid (or salt), or the olefine and acid are heated together in approximately equivalent amounts in the presence of an acid catalyst. No provision is made in any of these methods for the continuous addition of olefine and acid to replace that which has reacted by esterification.

Objects of the invention

The object of this invention is the preparation of esters from olefines and carboxylic acids by a method which permits of continuous operation. A more specific object resides in the continuous preparation of ethyl acetate from ethylene and acetic acid. These objects are accomplished by continuously adding olefine and a carboxylic acid to an acid catalyst maintained at such a temperature that the ester produced is continuously removed by distillation.

Description of the invention

It is known that ethylene reacts with sulfuric acid to form ethyl hydrogen sulfate, which in turn can be made to react with acetic acid or a salt thereof to form ethyl acetate. These reactions may be represented by the following equations:

(1) $C_2H_4 + H_2SO_4 \rightarrow C_2H_5OSO_2OH$

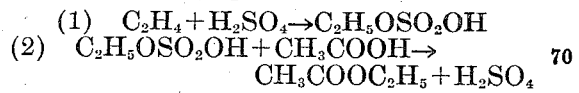

From these equations it will be noted that the sulfuric acid merely acts as a catalyst, since the sulfuric acid which combines with ethylene as indicated in Equation (1) is regenerated in the reaction represented by Equation (2). This suggested to me the possibility of preparing ethyl acetate in a continuous process by operating above the boiling point of ethyl acetate and by continuously replenishing the ethyl hydrogen sulfate and acetic consumed in Equation (2).

We have found that ethyl acetate can be prepared in one step by simultaneously adding ethylene and acetic acid to hot sulfuric acid. By continuing the addition of ethylene and acetic acid and by operating at a temperature sufficiently high to distill off the resulting ethyl acetate, the production of ethyl acetate becomes continuous. Assuming that the equations represented above are correct, this would mean that the sulfuric acid regenerated in Equation (2) serves to convert more ethylene and acetic acid into ethyl acetate. Theoretically, a given quantity of sulfuric acid should be capable of converting an unlimited quantity of ethylene and acetic acid into ethyl acetate. In practice, however, side reactions occur which result in the loss of some sulfuric acid, making it advisable to replenish the sulfuric acid from time to time. Acid catalyst equivalent to the loss by side reactions may be added either continuously or at intervals.

For the continuous production of ethyl acetate a spherical reaction vessel may be used which is equipped with inlets for ethylene, acetic acid and sulfuric acid, with a high speed stirrer, and with a distilling column through which the ethyl acetate can be continuously removed. Sulfuric acid is placed in this reaction vessel and heated to approximately 140° C. Ethylene and acetic acid are then introduced with vigorous stirring. The ethylene is preferably introduced in excess to aid in the distillation of the ethyl acetate. The distilling column through which the ethyl acetate and excess ethylene leave the reaction vessel is connected with a condenser and receiver to collect the ethyl acetate. The excess ethylene is washed, for example, with caustic soda to remove sulfur dioxide and other acid impurities and is then collected or returned to the reaction mixture.

The following examples illustrate the continuous process for the production of ethyl acetate.

*Example I*

Ethylene was introduced with stirring into 1200 parts by weight of 96% sulfuric acid at 70° C. until 216 parts by weight of ethylene had been absorbed. The ethylene was introduced at such a rate that absorption was practically complete. The temperature of the reaction mixture was then increased to 140° C. and the treatment with ethylene was continued using an excess of ethylene. At the same time acetic acid was slowly added to the mixture. This resulted in the continuous formation of ethyl acetate and its distillation from the reaction mixture along with excess ethylene and some acetic acid. The acetic acid was added to the reaction mixture at approximately the same rate at which the crude ethyl acetate mixture was distilled from the reaction vessel. The volume of the reaction mixture increased during the initial treatment with ethylene but remained fairly constant during the subsequent treatment with acetic acid and ethylene. The treatment with ethylene and acetic acid was continued for a period of eight days for an average of 6½ hours per day. The total yield of purified ethyl acetate was 1225 parts by weight. Of this amount 140 parts by weight was obtained on the last day, indicating that the reaction mixture was producing ethyl acetate on the eighth day at a rate only slightly lower than the average for the eight days. Analysis of the reaction mixture showed that it contained the equivalent of 732 parts by weight of 100% sulfuric acid. The loss of sulfuric acid was probably due to side reactions in which the acid was reduced to sulfur dioxide. This was evidenced by the fact that the exit ethylene was contaminated with sulfur dioxide. The yield of ethyl acetate, based on the 1004 parts by weight of acetic acid consumed in this experiment, was 91.4%. The yield on the basis of ethylene was not determined.

The acetic acid used in the above example is computed to have been of approximately 91% strength.

*Example II*

Ethylene and acetic acid were continuously introduced with stirring into 1200 parts by weight of 96% sulfuric acid maintained at approximately 140° C. During 33 hours' operation in the manner described in Example I, 439 parts by weight of pure ethyl acetate was obtained. The reaction mixture at the end of 33 hours' operation was found to contain the equivalent of 1077 parts by weight of 100% sulfuric acid. The yield of ethyl acetate on the basis of the 367 parts by weight of acetic acid consumed in the reaction was 81.5%. The acetic acid used in the above example is computed to have been of approximately 100% strength.

*Example III*

Ethylene and ectic acid were added continuously to a vigorously stirred mixture of 1000 parts by weight of 96% sulfuric acid and 500 parts by weight of acetic acid, heated to 130° C. The ethylene was introduced at a rate of approximately 40 parts by weight per hour and the acetic acid at a rate of about 60 parts by weight per hour. The distillation of the ethyl acetate from the reaction mixture was assisted by the excess ethylene. A large quantity of acetic acid also distilled from the reaction vessel. After 45 hours' operation at a temperature of 120–150° C., 2897 parts by weight of distillate was collected, from which 765 parts by weight of pure ethyl acetate was obtained by careful fractional distillation. The remainder was largely acetic acid. From a total of 1809 parts by weight of ethylene, 2731 parts by weight of acetic acid, and 1000 parts by weight of 96% sulfuric acid, 765 parts by weight of ethyl acetate was obtained; and 1467 parts by weight of ethylene, 1995 parts by weight of acetic acid, and 644 parts by weight of 100% sulfuric acid were recovered. The loss of sulfuric acid was probably due to side reactions in which the acid was reduced to sulfur dioxide. The reaction mixture was found to contain 72 parts by weight of carbon also resulting from side reactions. The yield of ethyl acetate on the basis of the ethylene consumed was 71.1% and on the basis of acetic acid consumed 70.9%.

The acetic acid used in the above example is computed to have been of approximately 100% strength.

The examples embody three variations in procedure with respect to the original reaction mixtures. By "original reaction mixture" is meant the initial mixture to which the acetic acid and ethylene are simultaneously added. In Example I the original mixture consists of the product formed by treating sulfuric acid with an approximately equivalent molecular quantity of ethylene. Chemically this product comprises ethyl hydrogen sulfate, diethyl sulfate, and sulfuric acid. Of course, sulfuric acid containing other percentages of absorbed ethylene might also be used. In Example II the original reaction mixture consists of sulfuric acid alone, where as in Example III the original reaction mixture consists of a mixture of sulfuric and acetic acids. In using a mixture of sulfuric acid and acetic acid, it is advantageous to have the acetic acid present in smaller amount than the sulfuric acid, in order to prevent the acetic acid from distilling too rapidly from the reaction mixture.

The strength of the sulfuric acid specified in the examples is 96%, but this is not intended to imply that this concentration is essential. However, since ethylene is only slowly absorbed in weak sulfuric acid, the use of strong sulfuric acid is preferred.

In the above examples it will be seen that the acetic acid used varied from 91% to 100% in strength, that is to say, it was used in highly concentrated form.

The formation of carbon during the reaction is mentioned in Example III. It is within the scope of my method to remove this material from the reaction mixture during the course of the reaction by filtration or by other suitable means. For example a portion of the reaction mixture containing carbon may be continuously withdrawn and filtered, the clean filtered liquid being returned to the reaction vessel.

The rate at which the ethylene and acetic acid are added may be varied considerably. In Example III the acetic acid was added in large excess and a considerable quantity distilled along with the ethyl acetate. It is also possible to operate in such a manner that practically all the ethylene and acetic acid are converted into ethyl acetate. The ethylene may also be diluted with an inert gas, such as nitrogen. The experiments described were all carried out at atmospheric pressure but increased or reduced pressures can also be used.

The preparation of ethyl acetate by the continuous method is not limited to the use of reaction vessels of the type described in connection with the examples. Ethylene may be introduced at the lower end of a tower-like reaction vessel down which a mixture of sulfuric acid, ethyl hydrogen sulfate, and diethyl sulfate is passed and in which acetic acid is introduced from the side. The ethyl acetate formed distills up through the tower and the sulfuric acid regenerated passes out at the bottom to be returned to the cycle. Complete reaction of the ethyl hydrogen sulfate by ester interchange with the acetic acid is not necessary, since the presence of ethyl hydrogen sulfate in the sulfuric acid aids in the absorption of ethylene. Other forms of reaction apparatus may also be used.

Although the examples illustrate particularly the production of ethyl acetate, the continuous process is also suitable for the production of other esters which do not completely decompose at the temperature maintained in the reaction zone. The process is broadly applicable to the production of low boiling esters, for example ethyl propionate, propyl acetate, ethyl butyrate, isopropyl acetate, and butyl acetate. A mixture of olefines or of gases containing olefines, such as those obtained in the cracking of petroleum, are capable of esterification by this method. Mixtures of carboxylic acids may also be used to produce a mixture of esters, and such mixtures may be used in conjunction with a mixture of olefines.

Where it is desired to apply the process to the production of the less volatile esters, for example, butyl butyrate which has a boiling point of 165° C., the reaction mixture is maintained at an esterification temperature and the reaction pressure is maintained at such a point that the ester distills as it forms. Thus, for example, butyl butyrate may be produced according to the continuous process herein described by passing butylene and butyric acid into sulfuric acid, heating preferably to about 140°–150° C., and reducing the pressure to a point at which butyl butyrate distills under the conditions maintained during the esterification reaction. Formic acid esters are somewhat unstable in the presence of concentrated sulfuric acid at esterification temperatures, but the invention may be applied to the production of such esters by maintaining the esterification temperature in the neighborhood of 130° C. or at a slightly lower temperature, and by reducing the concentration of the sulfuric acid by adding water.

Strong sulfuric acid has been described as a suitable catalyst for the esterification reaction. The invention, however, contemplates the use of other acid catalysts, among which may be mentioned phosphoric acid, and sulfonic acids such as chlor sulfonic and benzene sulfonic acid. The catalysts may, if desired, be dissolved or dispersed in suitable inert liquids such as paraffinic hydrocarbons of suitable boiling point, highly chlorinated hydrocarbons, etc.

This process provides an economical method for the production of esters directly from olefines. The advantages of a one-step, continuous process over the discontinuous or twostep processes described in the prior art are obvious. This method furnishes a convenient means for preparing lacquer solvents directly from olefines or gases containing olefines.

By the terms "continuous" and "continuously" as used throughout the specification and claims with reference to the introduction of olefine and acid into the reaction zone, I means to include the addition of these materials at intervals, as in a semi-continuous process, as well as their introduction in uninterrupted streams.

The above description of the invention and the specific examples are to be taken as illustrative only, and not as limiting the scope of the invention. Any variations or modifications which conform to the spirit of the invention are intended to be included within the scope of the claims.

I claim:

1. A process for the continuous production of esters which comprises continuously passing an olefine hydrocarbon and a highly concentrated lower aliphatic carboxylic acid into a reaction zone wherein is contained a body of esterification catalyst, maintaining the reaction zone at an esterification temperature which is in excess of the boiling point of the formed ester under the reaction conditions, continuously withdrawing the ester vapors from the reaction zone and subjecting said vapors to condensation.

2. A process for the continuous production of esters which comprises continuously passing a gaseous olefine hydrocarbon and a normally liquid highly concentrated lower aliphatic carboxylic acid into a reaction zone wherein is contained a body of acid esterification catalyst, maintaining the reaction zone at an esterification temperature which is in excess of the boiling point of the formed ester under the reaction conditions, continuously withdrawing the ester vapors from the reaction zone and subjecting said vapors to condensation.

3. A process for the continuous production of esters which comprises continuously passing an olefine hydrocarbon into a mixture of acid esterification catalyst and a highly concentrated lower aliphatic carboxylic acid in a reaction zone, maintaining the reaction zone at an esterification temperature which is in excess of the boiling point of the formed ester under the reaction conditions, continuously withdrawing the ester vapors from the reaction zone and subjecting said vapors to condensation.

4. A process for the continuous production of esters which comprises continuously passing an olefine hydrocarbon into a mixture of acid esterification catalyst and a highly concentrated lower aliphatic carboxylic acid in a reaction zone, continuously introducing carboxylic acid into the reaction zone, maintaining the reaction zone at an esterification temperature which is in excess of the boiling point of the formed ester under the reaction conditions, continuously withdrawing the ester vapors from the reaction zone and subjecting said vapors to condensation.

5. A process for the continuous production of esters which comprises continuously passing a highly concentrated lower aliphatic carboxylic acid into a reaction zone wherein is contained a body of acid esterification catalyst in which has been absorbed a quantity of an olefine hydrocarbon, maintaining the reaction zone at an esterification temperature which is in excess of the boiling point of the formed ester under the reaction conditions, continuously withdrawing the ester vapors from the reaction zone and subjecting said vapors to condensation.

6. A process for the continuous production of esters which comprises continuously passing a highly concentrated lower aliphatic carboxylic acid into a reaction zone wherein is contained a body of acid esterification catalyst in which has been absorbed a quantity of an olefine hydrocarbon, continuously introducing an olefine hydrocarbon into the reaction zone, maintaining the reaction zone at an esterification temperature which is in excess of the boiling point of the formed ester under the reaction conditions, continuously withdrawing the ester vapors from the reaction zone and subjecting said vapors to condensation.

7. The process described in claim 1 in which the said catalyst is concentrated sulfuric acid.

8. A process for the continuous production of esters which comprises continuously passing an olefine hydrocarbon and a highly concentrated lower aliphatic carboxylic acid into a reaction zone wherein is contained a body of concentrated sulfuric acid, maintaining the reaction zone at an esterification temperature which is in excess of the boiling point of the formed ester under the reaction conditions, removing from the reaction zone carbon which may have been formed by side reactions, continuously withdrawing the ester vapors from the reaction zone and subjecting said vapors to condensation.

9. A process for the continuous production of acetic acid esters which comprises continuously passing an olefine hydrocarbon into a reaction zone wherein is contained a mixture of highly concentrated acetic acid and an acid esterification catalyst, maintaining the reaction zone at an esterification temperature which is in excess of the boiling point of the formed ester under the reaction conditions, continuously withdrawing the ester vapors from the reaction zone and subjecting said vapors to condensation.

10. A process for the continuous production of acetic acid esters which comprises continuously passing an olefine hydrocarbon into a reaction zone wherein is contained a mixture of highly concentrated acetic acid and an acid esterification catalyst, continuously introducing acetic acid into the reaction zone, maintaining the reaction zone at an esterification temperature which is in excess of the boiling point of the formed ester under the reaction conditions, continuously withdrawing the ester vapors from the reaction zone and subjecting said vapors to condensation.

11. A process for the continuous production of acetic acid esters which comprises continuously introducing highly concentrated acetic acid into a reaction zone wherein is contained an acid esterification catalyst in which has been absorbed a quantity of an olefine hydrocarbon, maintaining the reaction zone at an esterification temperature which is in excess of the boiling point of the formed ester under the reaction conditions, continuously withdrawing the ester vapors from the reaction zone, and subjecting said vapors to condensation.

12. A process for the continuous production of acetic acid esters which comprises continuously introducing highly concentrated acetic acid into a reaction zone wherein is contained an acid esterification catalyst in which has been absorbed a quantity of an olefine hydrocarbon, continuously passing an olefine hydrocarbon into the reaction zone, maintaining the reaction zone at an esterification temperature which is in excess of the boiling point of the formed ester under the reaction conditions, continuously withdrawing the ester vapors from the reaction zone, and subjecting said vapors to condensation.

13. A process for the production of ethyl acetate which comprises continuously passing ethylene and highly concentrated acetic acid into a reaction zone wherein is contained a body of acid esterification catalyst, maintaining the reaction zone at an esterification temperature which is in excess of the boiling point of ethyl acetate, continuously withdrawing the ethyl acetate vapors from the reaction zone, and subjecting said vapors to condensation.

14. The process described in claim 13 in which the acid catalyst is concentrated sulfuric acid.

15. The process described in claim 13 in which the esterification temperature used is about 120°–150° C.

16. The process described in claim 13 in which the esterification temperature is about 140° C.

17. A process for the continuous production of ethyl acetate which comprises continuously passing ethylene and highly concentrated acetic acid into a reaction zone in which is contained a mixture of acetic acid and concentrated sulfuric acid, maintaining the reaction zone at a temperature of about 120–150° C., continuously withdrawing the vapors of ethyl acetate from the reaction zone, and subjecting said vapors to condensation.

18. A process for the continuous production of ethyl acetate which comprises continuously passing ethylene and highly concentrated acetic acid into a reaction zone containing concentrated sulfuric acid in which has been absorbed a quantity of ethylene, maintaining the reaction zone at a temperature of about 120°–150° C., continuously withdrawing the vapors of ethyl acetate from the reaction zone, and subjecting said vapors to condensation.

19. In a process for the continuous production of esters which comprises continuously passing an olefine hydrocarbon into a reaction zone containing a lower aliphatic monocarboxylic acid and an esterification catalyst, wherein carbon is formed as a result of a side reaction, the step which comprises removing formed carbon without disturbing the continuity of the reaction.

20. The process of claim 19 in which the olefine is ethylene and the monocarboxylic acid is acetic acid.

21. The process of claim 19 in which the esterification catalyst is strongly acid.

22. The process of claim 19 in which a portion of the reaction mixture is continuously withdrawn from the reaction zone, the carbon removed therefrom and the carbon-free liquid then returned to the reaction zone.

In testimony whereof, I affix my signature.

GEORGE DE WITT GRAVES.